United States Patent [19]

Hager

[11] 4,351,636

[45] Sep. 28, 1982

[54] BELT TENSIONING DEVICE

[76] Inventor: Clarence H. Hager, 3408 Corbridge Lane, Rockford, Ill. 61107

[21] Appl. No.: 157,101

[22] Filed: Jun. 6, 1980

[51] Int. Cl.³ ............................................. F16H 7/12
[52] U.S. Cl. .................................... 474/135; 474/138
[58] Field of Search ..................... 474/135, 138, 117

[56] References Cited

U.S. PATENT DOCUMENTS

| 1,557,486 | 10/1925 | Valentine | 474/135 |
|---|---|---|---|
| 1,783,987 | 12/1930 | Thompson | 474/138 |
| 1,877,194 | 9/1932 | Nyborg et al. | 474/135 |
| 2,663,195 | 12/1953 | Horan | 474/135 |
| 3,374,686 | 3/1968 | Brewer | 474/135 |
| 3,975,965 | 8/1976 | Speer | 474/135 |
| 4,108,013 | 8/1978 | Sragel | 474/135 |
| 4,145,934 | 3/1979 | Spragal | 474/135 |

OTHER PUBLICATIONS

Photographs of a belt tensioning device manufactured by Magna International, Inc. of Downsview, Ontario.

Primary Examiner—C. J. Husar
Assistant Examiner—Conrad L. Berman
Attorney, Agent, or Firm—Vernon J. Pillote

[57] ABSTRACT

A belt tensioning device including a mounting bracket, a pulley support arm pivotally mounted at one end on the mounting bracket and having an idler pulley rotatably mounted at its other end. A spring yieldably biases the arm in a direction to press the idler pulley against the belt. The arm has opposed wall faces disposed in planes perpendicular to the pivot axis of the arm and mounted on the bracket and have pad faces pressed into engagement with respective ones of the opposed wall faces on the arm to dampen vibration or oscillation of the arm.

19 Claims, 8 Drawing Figures

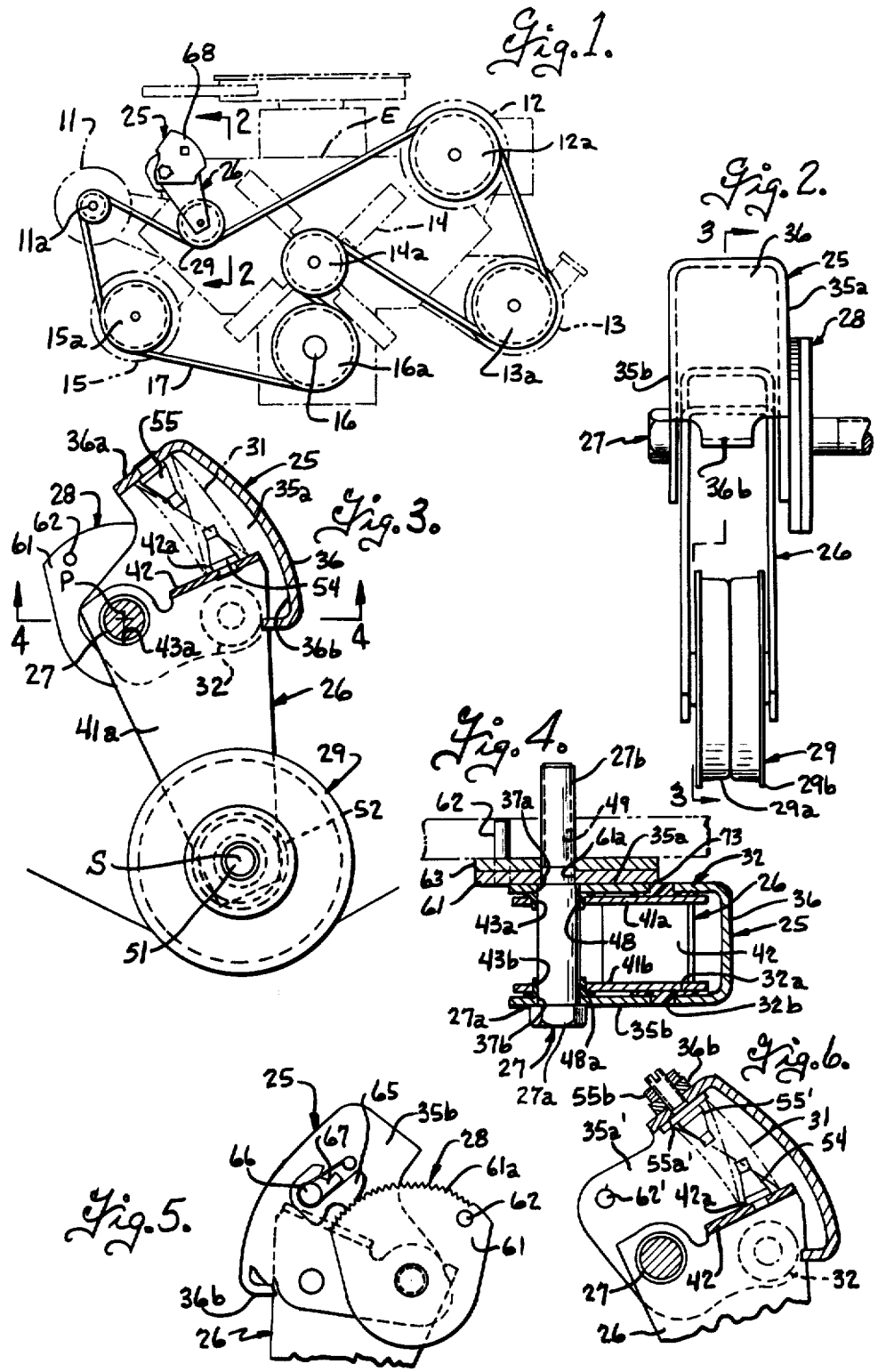

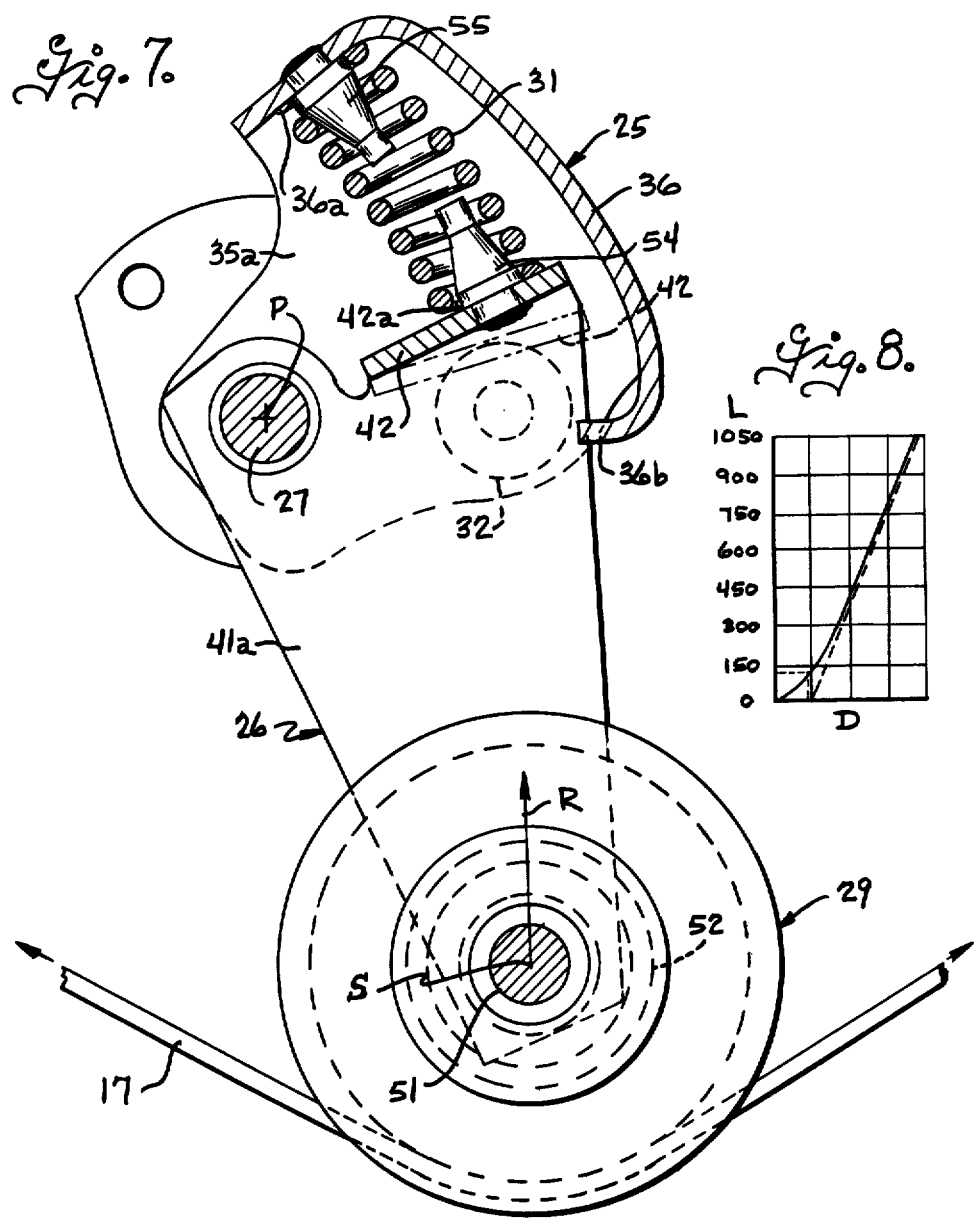

BELT TENSIONING DEVICE

BACKGROUND OF THE INVENTION

Belt drives are commonly used to transmit power from a drive pulley to one or more driven pulleys. One problem encountered in belt drives is the maintenance of proper belt tension. Insufficient belt tension allows the belt to slip on the drive and/or driven pulleys and such belt slippage not only reduces the power transmitted from the drive to the driven pulleys, but also produces noise and heat which can cause hardening and deterioration of the belt. Excessive belt tension, on the other hand produces excessive bearing loads on the various devices connected by the belt drive and further tends to cause stretching of the belt. Another problem encountered in belt drives, particularly those utilized for driving a plurality of accessories on an internal combustion engine, is that the belt tends to vibrate, particularly under non-uniform or pulsating loads such as those encountered when certain accessories such as the air conditioner are being driven.

Various different belt tensioning devices such as shown in U.S. Pat. Nos. 1,557,486; 2,663,195; 3,374,686 and 4,145,934 have heretofore been proposed to maintain a more uniform tension on the belt. In general, such belt tensioning devices include an idler pulley which is mounted on an arm yieldably biased in a direction to tension the belt. The belt tensioning device in U.S. Pat. Nos. 1,557,486, 2,663,195 and 3,374,686 mount the arm or lever of the belt tensioning device so that it can move both inwardly and outwardly relative to the belt to control belt tension. However, the belt tensioning devices of those patents have no provision for controlling vibration or oscillation of the belt tensioning device and belt. U.S. Pat. No. 4,145,934 provides a wedge on the lever arm of the belt tensioner that engages an eccentric cam on the lever arm pivot to provide an adjustable stop which allows the belt tensioning pulley to move inwardly toward the belt when the belt tension decreases, but which inhibits outward movement of the pulley and lever arm in the event the belt tension increases. Although the patent states that the wedge member can be formed of an elastomeric material for added dampening, a wedge member of elastomeric material would only function as a resilient abutment or stop to limit movement of the belt tensioning device in a direction outwardly of the belt.

SUMMARY OF THE INVENTION

An important object of the present invention is to overcome the disadvantages of the prior art by providing a belt tensioning device which is spring loaded into engagement with the belt to control belt tension and which has an improved arrangement for controlling vibration and oscillation of the belt tensioning device.

Another object of this invention is to provide a belt tensioning device in which a variable rate spring is provided for biasing the tensioning device into engagement with a belt.

Another object of this invention is to provide a belt tensioning device which is adjustable to control the amount of belt tension.

Accordingly, the present invention provides a belt tensioning device for tensioning an endless belt entrained over pulleys on an apparatus. The tensioning device includes a pulley support arm, a mounting bracket, means mounting the pulley support arm on the mounting bracket and on the apparatus for pivotal movement about a pivot axis, and anchor means for retaining the mounting bracket in a preselected position on the apparatus. An idler pulley is mounted on the free end of the pulley support arm, spring and means is provided for yieldably biasing the support arm in a direction to press the idler pulley against the belt. One of the items comprising the arm and mounting bracket have a pair of oppositely facing wall surfaces disposed in parallel planes perpendicular to the pivot axis and spaced radially outwardly therefrom, and a pair of vibrating dampening pads each having a pad face are mounted on the other of the items with the pad faces at locations spaced outwardly from the pivot axis to slidably engage a respective one of the oppositely facing wall surfaces and with the pads pressed in a direction perpendicular to the respective pad face into engagement with respective wall surface.

The pads are advantageously formed of an elastomeric material and compressed in a direction perpendicular to the pad face to have pressurized engagement with the opposing wall surfaces. The spring is advantageously a compression spring selected and arranged so that it is longitudinally arched to provide a variable spring rate. Provision is also advantageously made for adjusting the spring pressure applied to the pulley tensioning arm to adjust the belt tension.

These, together with other objects, advantages and features of the present invention will be more readily understood by reference to the following detailed description and the accompanying drawings wherein:

FIG. 1 is a diagrammatic front view of an automobile engine having a serpentine belt drive for driving a number of accessories from the engine crankshaft and having the belt tensioning device of the present invention applied thereto;

FIG. 2 is a front elevational view of the belt tensioning device taken on plane 2—2 of FIG. 1;

FIG. 3 is a sectional view through the belt tensioning device taken on the plane 3—3 of FIG. 2;

FIG. 4 is a sectional view of the belt tensioning device taken on the plane 4—4 of FIG. 3;

FIG. 5 is a fragmentary rear side elevational view of the belt tensioning device;

FIG. 6 is a fragmentary sectional view through a modified from of belt tensioning device;

FIG. 7 is a sectional view through the belt tensioning device taken on the plane 3—3 of FIG. 2 and illustrating the parts on a larger scale; and FIG. 8 is a graph illustrating the load deflection curve of the belt tensioning spring.

Referring now to FIG. 1 there is diagrammatically illustrated an internal combustion engine E having a plurality of accessories such as a generator 11, an air conditioner compressor 12, power steering pump 13, fan 14, and pollution control blower 15. Although plural belts can be utilized to connect the engine drive pulley 16a on the main engine crankshaft 16 to the different accessories, some automobiles utilize a single belt such as 17 that is entrained in serpentine fashion over the drive pulley 16a and over the pulleys 11a–15a on the accessories 11–15. When a single belt is used, it is commonly made in the form of a wide flat belt with a plurality of V-grooves on one side, namely the inner side, and the pulleys such as 11a, 12a, 13a, 15a and 16a that engage the inner side of the belt are complementarily grooved to receive the ribs on the belt. As shown, the belt is entrained so that its back side passed over the pulley 14a on the fan 14. The belt tensioning apparatus 20 of the present invention is mounted on the vehicle engine at a location to engage the belt intermediate the pulleys on several accessories. The belt tensioning device can be arranged to engage either the inner or outer side of the belt and is herein shown positioned to engage the outer side of the belt at a location intermediate the pulleys 11a and 12a.

It is imporant to maintain the belt tension within a predetermined working range in which the belt tension is sufficiently high to prevent excessive slippage between the belt and the drive and driven pulleys, and which is yet not so high as to cause excessive bearing loads which could cause premature wear of the bearings in the various accessories or excessive belt stretching. Moreover, it is important to control the belt tension under widely varying operation conditions, including widely varying temperatures and engine speeds, and over a long period of operation, for example, 20,000, 30,000 or more miles. In addition, it is important to control the vibration or oscillation of the belt under the various different operating conditions encountered. In the automotive engine, the most severe vibrations and oscillations appear to be encountered during operation of the air conditioning compressor with peak oscillations occurring during starting and stopping of the compressor. The belt tensioning apparatus 20 of the present invention is arranged to maintain the belt tension within a preselected range and to inhibit vibration or oscillation of the belt tensioner and in this manner to control vibration or oscillation of the belt.

The belt tensioning apparatus in general includes a mounting bracket 25, a pulley support arm 26, a means 27 for mounting one end of the pulley support arm on the mounting bracket and on the apparatus for pivotal movement relative thereto about a pivot axis, anchor means 28 for retaining the mounting bracket in a preselected position on the apparatus, an idler pulley 29 mounted on the free end of the pulley support arm for rotaion about a pulley axis spaced from and parallel to the pivot axis, a spring means 31 for yieldably biasing the pulley support arm in a direction to press the idler pulley against the belt, and vibration dampening means 32 for controlling oscillation and vibration of the pulley support arm relative to the bracket 25.

The bracket 25 is preferably in the form of a housing having a generally U-shaped cross-section and including spaced side walls 35a and 35b and a connecting wall 36 that extends between the side walls 35a and 35b along a portion of their periphery. The side walls 35a and 35b have aligned openings 37a, 37b (FIG. 4) extending therethrough and spaced from the connecting wall 36. As best shown in FIGS. 3 and 7, the connecting wall 36 has a longitudinally arched configuration and a laterally extending portion 36a at one end to form a spring abutment, and an inwardly extending lip portion 36b at the other end to form a stop.

The pulley support arm 26 is conveniently formed of flat sheet stock and includes spaced side walls 41a and 41b, a connecting wall 42 extending between the side walls adjacent one end, and a pair of aligned openings 43a and 43b (FIG. 4) in the side walls adjacent the connecting wall 42. One end portion of the arm is disposed between the side walls of the mounting bracket 25 and is pivotally mounted on the housing and on the engine E by a pivot 27. As best shown in FIG. 4, bushings 48 are disposed in the openings 43a 43b in the side walls 41a and 41b of the pulley support arm and the bushings are preferably of the flange type with their flanges 48a interposed between the side walls on the pulley support arm and the adjacent side walls on the mounting bracket 25, to control spacing therebetween. The bushings 48 may be formed of any suitable bearing material and may be formed of a plastic material having a low coefficient of friction. For example, the bushings can be formed of a polyacetal based oil lubricated plastic such as distributed by Cadillac Chemical Co. under the trademark "Oilon". This plastic is heavily lubricated with a petroleum based lubricant and has a relatively low coefficient of friction, for example 0.05 to 0.10 against polished metal. The pivot pin 27 extends through the aligned openings 37a and 37b in the mounting bracket and through the bushings 48 on the pulley support arm to pivotally mount the support arm on the bracket for movement relative thereto of the axis P of the pivot pin.

The pulley 29 is mounted between the side walls 41a and 41b of the pulley support arm, at the end remote from the connecting portion 42, as by a pin or bolt 51. The pulley may be of any suitable construction and, when used to engage the outer side of a flat belt, is preferabley provided with a crowned surface 29a and flanges 29b at opposite edges. The pulley is preferably rotatably supported on the pin by an anti-friction ball or roller bearing 52.

The pulley support arm 26 is spring biased relative to the mounting bracket 25 in a direction to press the pulley 29 into engagement with the belt, to control belt tension. As best shown in FIGS. 3 and 7, a spring 31 is interposed between a first spring abutment 42a on the pulley support bracket 26 and which is spaced outwardly from the pivot axis, and a second abutment 36a on the mounting bracket that is also spaced outwardly from the pivot axis. Spring 31 is advantageously a coil type compression spring and may be formed of spring wire or a solid or tubular elastomeric material. Spring locaters 54 and 55 are mounted on the connecting portion 42 of the arm and on the spring abutment 36a of the mounting bracket and extend into the ends of the spring to locate the ends of the spring on the arm and bracket, respectively. For reasons to be discussed more fully hereinafter, the compression spring is normally in the form of a straight cylinder having flat ends perpendicular to the axis of the cylinder. The spring abutments 42a and 36a, however, are preferably arranged so that they form an acute angle therebetween that progressively decreases as the pulley support arm pivots about the pivot axis in a direction opposite the spring direction. With this arrangement, the normally straight compression spring having parallel end faces when undistended, becomes longitudinally arched as shown in the drawings when disposed between the first and second spring abutments with its end faces seated against the same. A straight coil type compression spring when compressed in a direction along its axis, has a uniform spring rate as indicated by the broken line in the graph of FIG. 8. However, when the normally straight compression spring is disposed between abutment faces that are initially disposed at an acute angle to each other and which move toward a parallel position, the spring exhibits a variable rate which is initially lower than the spring rate of the straight spring and which progressivley increases and becomes equal to the rate of the straight spring when the abutment faces move into parallelism. The spring is preferably selected so that the belt tensioning apparatus operates in the lower curved or variable rate portion of the spring load deflection curve, when maintaining the belt tension in the desired range.

The belt tensioning apparatus 20 is mounted on the engine E at a location to engage a run of the belt between two adjacent pulleys and provision is made for adjusting the pressure applied by the belt tensioning apparatus to the belt, to control belt tension. In the embodiments of FIG. 1–5, the mounting bracket 25 is mounted on the engine for angular adjustment relative thereto about the pivot axis, to control the preset pressure applied by the belt tensioning apparatus to the belt. As best shown in FIG. 4, the pivot pin 27 has a head 27a on one end and a threaded end portion 27b that is adapted to be threaded into an opening 49 on the engine or a part rigid with the engine. The housing 25 can turn about the pivot pin 27 and an anchor means is provided for retaining the mounting bracket in a preselected position. In the embodiment of FIGS. 1–5, this means includes a sector plate 61 having an opening 61a for receiving the pivot pin, and which sector plate is anchored to the engine or a part rigid with the engine by a anchor pin 62 that is spaced from the pivot pin and which extends into an opening in the engine to prevent turning of the sector plate. A spacer plate 63 either rigid with or separate from the sector plate is provided to space the belt tensioning device the proper distance from the engine so as to be in alignment with the drive and driven pulleys. The sector plate 61 has teeth 61a (FIG. 5) along at least a portion of its periphery and a pawl 65 is pivotally mounted as by a pin 66 on the housing and is yieldably biased as by a spring 67 in a direction to engage the teeth 61a on the sector plate 61. The pawl is arranged so that the housing can pivot in a clockwise direction as viewed in FIG. 3 about the pivot pin 27 (counterclockwise a viewed in FIG. 5) relative to the sector plate. This moves the belt tensioning device in a clockwise direction as viewed in FIG. 3 until the pressure exerted by spring 31 on the pulley support arm and pulley produces the desired belt tension. Any suitable means may be provided for adjusting the mounting bracket 25 and, as shown in FIG. 1, the side wall 35b is provided with a polygonal opening 68 spaced outwardly from the pivot pin to receive a complementarily configured end portion on a suitable adjusting tool. The opening 68 may, for example, be a half-inch square opening to receive the one-half inch driver head on a torque wrench. The torque wrench can be used to angularly adjust the mounting bracket during installation of the belt tensioning device on the engine, and the torque measurement utilized as an indication of the pressure being applied to the belt and hence the belt tension. Alternatively, a belt tension gauge of the type shown in U.S. Pat. No. 2,996,914 can be utilized to directly measure the belt tension during installation.

Instead of angularly adjusting the mounting bracket relative to the engine to adjust the pressure applied by the spring to the pulley support arm, the mounting bracket can be mounted in a fixed position on the engine and the spring pressure adjusted by adjusting one of the spring abutments. In the modified embodiment shown in FIG. 6, the side wall 35a' of the pulley housing is directly anchored to the engine or a part fixed to the engine by a anchor pin 62'. One of the spring locaters designated 55' has a spring abutment face 55a' formed integrally therewith and the spring locater is threadedly mounted in a boss 36b' on the housing, so that the abutment can be adjusted relative to the housing to adjust spring pressure. A lock nut 55b' can be provided to lock the abutment in its adjusted position.

The belts on the automotive engine tend to vibrate or oscillate under different operating conditions and particularly when subjected to cyclical or pulsating loads such as occur when the air conditioner compressor 12 is in operation. The vibration dampening means 32 is provided to control oscillation of the pulley support arm relative to the mounting bracket and to thereby control vibration and oscillation of the belt. The vibration dampening means 32 comprises a pair of vibration dampening pads that are mounted on one of the items comprising the mounting bracket and pulley support arm at a location spaced outwardly from the pivot axis, and which pads have pad faces 32a disposed in planes perpendicular to the pivot axis to engage wall surfaces on the side walls of the other of the items. In the embodiment illustrated, the vibration dampening pads 32 are mounted on the side walls 35a and 35b of the mounting bracket and the pad faces engage the side walls of the pulley support arm, it being understood that the vibration dampening pads could be mounted on the side walls of the pulley support arm with pad faces engaging the side walls of the mounting bracket, if desired. The pads are pressed in a direction perpendicular to the pad faces into engagement with the side walls of the pulley support arm to have pressurized engagement therewith and to inhibit movement of the pulley support arm relative to the mounting bracket. The pads are advantageously formed of a resilient elastomeric material having a pad thickness somewhat greater than the clearance between the side walls of the pulley support arm and the side walls of the mounting bracket, so that the pads are axially compressed when the pulley support arm is assembled. As shown, the pads are formed with a reduced diameter extension 32b on the sides opposite the pad faces 32a, and which extensions project into an opening 73 in the respective side wall of the mounting bracket to hold the vibration dampening pads against movement relative to the mounting bracket. The pads are preferably formed of solid polyurethane having a hardness in the range of about 75 to 95 on the durometer "A" scale, with a hardness of 85 preferred. Formation of the vibration dampening pads of resilient elastomeric material is considered to have several advantages. The resilient material can be compressed between the side walls of the pulley housing and support arm to pressurize the pad faces against the side walls of the pulley support arm, and the amount of compression can be controlled by controlling the thickness of the pad in relation to the clearance space between the side walls of the pulley housing and the side walls of the support arm. Further, formation of the pads of a resilient material such as polyurethane has been found to provide adequate dampening to control vibration or oscillation of the belt tensioning device and belts, without substantially adversely affecting the tension maintained on the belt by the belt tensioning device. Although the vibration dampening pads 32 mounted in the manner described above do inhibit movement of the pulley support arm in either direction relative to the mounting bracket, they do not adversely affect the average belt tension maintained by the belt tensioning apparatus. It has been found that when the belt tensioning apparatus is mounted on the engine and the spring abutments adjusted until the spring 31 provides a predetermined belt tension, that the belt tensioning apparatus will continue to maintain the belt tension substantially constant over widely varying operating and temperature conditions and after extensive periods of operation. It is believed that the vibration dampening pads formed of elastomeric material when compressed against the wall surfaces, do inhibit rapid sliding movement between the pad faces on the wall surfaces, but they do tend to allow a slow creepage between the pad faces and wall surfaces under the operating conditions encountered in the automobile, so that the average tension maintained in the belt remains substantially constant as determined by the force exerted by the spring 31.

The force which must be applied by the spring 31 through arm 26 to the axis of the pulley 29 in order to maintain a preselected belt tension, is dependant upon a number of factors including the angle of the belt runs entering and exiting from the pulley 29, relative to each other and to the pivot axis P. In a frictionless pulley, the resultant R of the belt tension forces acting on the pulley axis is along the line approximately bisecting the angle between the entering and exiting spans of the belt, and the force which must be applied by the spring on the arm to maintain a preselected belt tension is dependant on the magnitude and direction of the resultant R, as well as upon the spacing of the spring axis from the support arm pivot axis P. In the embodiment illustrated, the angle between the belt runs entering and exiting the pulley 29 is about 150° and the resultant of the belt tension forces is along a line indicated by the arrow R. The spring 31 is selected and the spring compression is adjusted to apply a force to the pulley support arm sufficient to produce a tension in the belt adjacent the upper end of the desired range of belt tension to be maintained in the belt. For example, to maintain a belt tension in the range of 100 to 130 lbs., the spring 55 was selected to have an undistended length of two inches and a spring rate of about 150 lbs. per one-tenth inch, when the spring was compressed in its axial direction. The spring abutment faces 42a and 36a are disposed at a shallow acute angle to each other when the spring abutment face 42a is positioned away from the abutment 36a as shown in phantom lines in FIG. 7, a distance sufficient to receive the spring 31 in its unloaded condition therebetween. As the spring abutment 42a is moved from the phantom line position toward the spring abutment 32a to a position such as shown in solid lines in FIG. 7, the spring arches longitudinally as shown in FIG. 7, and the flat ends of the spring seat against the abutment faces 36a and 42a. This provides a variable spring rate as the abutment faces move toward parallelism. As shown in solid lines in the graph of FIG. 8, the effective spring rate is initially lower than the axial compression spring rate shown in broken lines in FIG. 8, and the effective spring rate progressively increases and becomes equal to the axial compression spring rate when the abutment faces approach parallelism. With the belt and tensioner geometry described above, a spring loading of about 110-130 lbs. produced a belt tension of about 130 lbs. Thus, the spring was operated in the lower variable rate portion of its load-deflection curve.

The vibration dampening pads were formed of solid polyurethane having a hardness of about 85 on the Shore "A" scale, and the pads were formed with an undistended thickness of about 0.075 inches, which was about 0.020 to 0.025 greater than the clearance between each side wall of the pulley support arm and the adjacent side walls of the mounting bracket, so that the pads were axially compressed. Vibration dampening pads formed in this manner were found to effectively dampen vibration of the pulley support arm and belt under widely varying operating conditions. It is thought that low amplitude belt oscillations or vibrations tend to be absorbed by internal motion of the elastometric dampening pads without slippage of the pad faces relative to the abutting wall surfaces. Larger amplitude belt vibrations may cause some sliding or slippage of the pad faces relative to the abutting wall surfaces, but rapid sliding is resisted or damped by the friction between the pad faces and the abutting wall surfaces. Although the elastomeric dampening pads do inhibit rapid sliding movement between the pad faces and wall surfaces, it appears that they do allow a slow creepage between the pad faces and the wall surfaces under the operating conditions encountered in the automobile, so that the average belt tension remains substantially constant as determined by a force exerted by the spring 31.

The embodiments of the invention in which an exclusive property or privilege is claimed are defined as follows:

1. A belt tensioning device for tensioning an endless belt entrained over pulleys on an apparatus, the tensioning device comprising, a pulley support arm, a mounting bracket, means mounting said pulley support arm on said mounting bracket and on said apparatus for pivotal movement relative thereto about a pivot axis, anchor means for retaining the mounting bracket in a preselected position on the apparatus, an idler pulley mounted on the free end of said pulley support arm for rotation about a pulley axis spaced from and parallel to said pivot axis, spring means for yieldable biasing said support arm in a direction to press the idler pulley against the belt, one of the items comprising support arm in a direction to press the idler pulley against the belt, a pair of vibration dampening pads formed of resilient material and each having a pad face, means fixedly mounting the pads on the side walls of one of the items comprising the support arm and mounting bracket at locations spaced outwardly from the pivot axis with the pad faces slightly engaging respective ones of the side walls of the other of said items and with the pads compressed in a direction perpendicular to the side walls on said other of said items to pressurize the pad faces into engagement therewith.

2. A belt tensioning device according to claim 1 wherein the pads are formed of a resilient material and are compressed in a direction perpendicular to the respective pad face to pressurize the pad faces into engagement with the respective wall surface.

3. A belt tensioning device according to claim 1 wherein said pads are formed of solid polyurethane having a hardness in a range of about 75-95 on the durometer "A" scale.

4. A belt tensioning device according to claim 1 including a first spring abutment means on the arm spaced outwardly from the pivot axis, second spring abutment means on the mounting bracket generally opposing and spaced from the first spring abutment means, said spring means comprising a compression spring interposed between said first and second spring abutment means.

5. A belt tensioning device according to claim 4 including means for adjusting the position of said second spring abutment means relative to said apparatus to adjust the pressure applied by the compression spring means to the arm.

6. A belt tensioning device according to claim 4 wherein said mounting bracket is angularly adjustable about said pivot axis relative to said apparatus, said anchor means including means for securing said mounting bracket in different angularly adjusted positions relative to said apparatus.

7. A belt tensioning device according to claim 4 including means for adjusting said second spring abutment means relative to said mounting bracket.

8. A belt tensioning device according to claim 4 wherein said first and second spring abutment means define between them an acute angle that progressively decreases as the pulley support arm pivots about said pivot axis in a direction opposite said one direction, said compression spring means being straight and having parallel end faces when undistended and being longitudinally arched when disposed between said first and second spring abutment means with its end faces seated against the same.

9. A belt tensioning device for tensioning an endless belt entrained over pulleys on an apparatus, the tensioning device comprising, a mounting bracket having a pair of laterally spaced side walls, a pulley support arm having a pair of laterally spaced side walls, one end portion of the pulley support arm being disposed between said side walls of said mounting bracket, pivot pin means mounting said one end portion of pulley support arm on said mounting bracket for pivotal movement relative thereto about a pivot axis, bracket mounting means for attaching the mounting bracket on the apparatus, an idler pulley disposed between the side walls of the support arm and mounted on the free end of the support arm for rotation about an axis spaced from and parallel to said pivot axis, a first spring abutment means disposed between said side walls of said support arm adjacent said one end portion thereof and spaced outwardly from said pivot axis, a second spring abutment means disposed between said side walls of said mounting bracket and spaced outwardly from said pivot axis, compression spring means interposed between said first and second spring abutment means for yieldably biasing said support arm in a direction to press the idler pulley against the belt, a pair of vibration dampening pads formed of resilient material and each having a pad face, means fixedly mounting the pads on the side walls of one of the items comprising the support arm and mounting bracket at locations spaced outwardly from the pivot axis with the pad faces slidably engaging respective ones of the side walls of the other of said items and with the pads compressed in a direction perpendicular to the side walls on said other of said items to pressurize the pad faces into engagement therewith.

10. A belt tensioning device according to claim 9 wherein said pads are formed of solid polyurethane having a hardness of about 75-95 on the durometer "A" scale.

11. A belt tensioning device according to claim 9 including means for adjusting the position of said second spring abutment means relative to said apparatus to adjust the pressure applied by the compression means of the arm.

12. A belt tensioning device according to claim 9 wherein said side walls of said mounting bracket and said side walls of said support arm have aligned openings therethrough, said pivot pin means extending through said aligned openings.

13. A belt tensioning device according to claim 9 wherein said mounting bracket is angularly adjustable about said pivot axis relative to said apparatus, the bracket mounting means including means for securing the mounting bracket in different angularly adjusted positions relative to said apparatus.

14. A belt tensioning device according to claim 9 wherein said first and second spring abutments define between them an acute angle that progressively decreases as the pulley support arm pivots about said pivot axis in a direction opposite said one direction, said compressing spring means being straight and having parallel end faces when undistended and being longitudinally arched when disposed between said first and second spring abutments with its end faces seated against the same.

15. A belt tensioning device for tensioning an endless belt entrained over pulleys on an apparatus, the tensioning device comprising a mounting bracket having a pair of laterally spaced side walls and a connecting wall extending between the side walls along a portion of the periphery thereof and aligned openings in the side walls at locations spaced from the connecting wall, a pulley support arm having a pair of laterally spaced side walls and a connecting wall extending between the side walls adjacent one end portion thereof and aligned openings in the side walls adjacent said one end portion thereof, said one end portion of the pulley support arm being disposed between said side walls of said mounting bracket, mounting pin means extending through the aligned openings in the side walls of the mounting bracket and through the aligned openings in the side walls of the pulley support arm for mounting said pulley support arm on said mounting bracket for pivotal movement relative thereto about a pivot axis, bracket mounting means for attaching the mounting bracket to the apparatus, an idler pulley disposed between the side walls of the support arm and mounted for rotation about an axis spaced from and parallel to said pivot axis, a first spring abutment means on said connecting wall of the support arm and spaced outwardly from said pivot axis, a second spring abutment means disposed between said side walls of said mounting bracket and spaced outwardly from said pivot axis, compression spring means interposed between said first and second spring abutment means for yieldably biasing said support arm in a direction to press the idler pulley against the belt, a pair of vibration dampening pads formed of resilient material each interposed between a respective side wall on the pulley support arm and the adjacent side wall of the housing and each having a thickness when unloaded which is greater than the clearance between each side wall on the pulley support arm and the adjacent side walls on the housing so that the pads are compressed therebetween, means connecting the pads to side walls on one of the items comprising the pulley support arm and the housing, the pads each having a smooth pad face slidably engaging the side walls in the other of the items.

16. A belt tensioning device according to claim 15 wherein the pads are formed of solid polyurethane having a hardness in a range of about 75 to 95 on the durometer "A" scale.

17. A belt tensioning device according to claim 15 including a flanged bushing disposed in the openings in each of the side walls of the support arm with the flange on the bushings interposed between the respective side wall on the support arm and the adjacent side wall on the housing.

18. A belt tensioning device according to claim 15 wherein said mounting bracket is angularly adjustable about said pivot axis relative to said apparatus, the bracket mounting means including means for securing said mounting bracket in different angular adjusted positions relative to said apparatus.

19. A belt tensioning device according to claim 15, wherein the pads are formed of solid polyurethane having a hardness of about 85 on the durometer "A" scale.

* * * * *

UNITED STATES PATENT AND TRADEMARK OFFICE
CERTIFICATE OF CORRECTION

PATENT NO. : 4,351,636
DATED : September 28, 1982
INVENTOR(S) : Clarence H. Hager It is certified that error appears in the above—identified patent and that said Letters Patent are hereby corrected as shown below:

Claim 1, column 8, line 36, "support" should be deleted;
Claim 1, column 8, lines 37 through 47 should be deleted and the following added: -- the arm and the mounting bracket having a pair of oppositely facing wall surfaces disposed in parallel planes perpendicular to said pivot axis and spaced radially outwardly therefrom, a pair of vibration dampening pads each having a pad face, means mounting the pads on the other of the items with the pad faces at locations spaced outwardly of the pivot axis to slidably engage respective ones of the oppositely facing wall surfaces and with the pads pressed in a direction perpendicular to the respective pad face into pressurized engagement with a respective wall surface. --

Signed and Sealed this

Seventh Day of December 1982

[SEAL]

Attest:

GERALD J. MOSSINGHOFF

Attesting Officer       Commissioner of Patents and Trademarks